Feb. 24, 1948.     J. J. DE LUCE     2,436,469
EGG HOLDER
Filed March 19, 1946
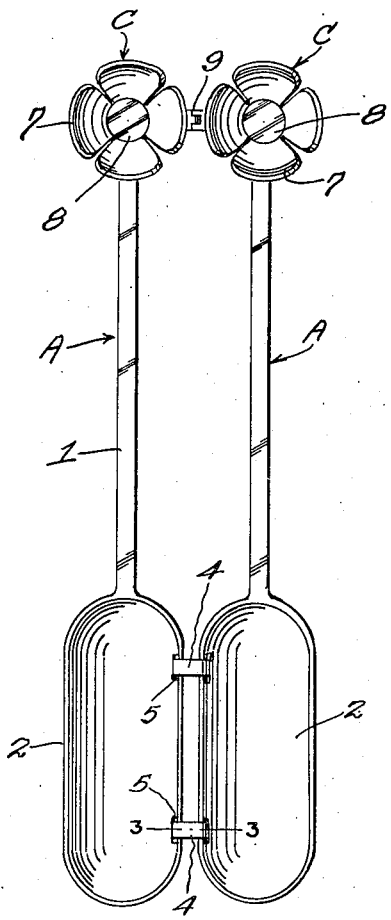
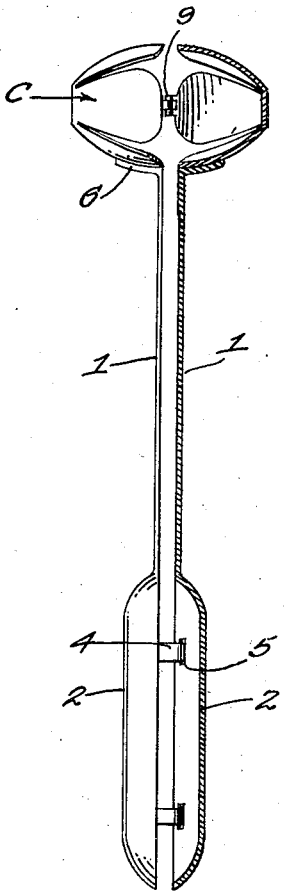
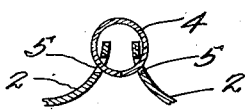
Inventor
John J. DeLuce
By *Wilfred E. Lauen*
Attorney Patented Feb. 24, 1948

2,436,469

UNITED STATES PATENT OFFICE 2,436,469

EGG HOLDER

John J. De Luce, Minneapolis, Minn.

Application March 19, 1946, Serial No. 655,509

6 Claims. (Cl. 294—104)

This invention relates to an egg holder and it is an object of the invention to provide a device of this character which can be employed to advantage to remove eggs, such as soft boiled eggs, out of utensils and wherein such egg is held in a manner to permit the ready breaking of the egg shell with a knife or other implement.

Another object of the invention is to provide a device of this kind for holding an egg in a manner whereby after the egg shell has been broken the egg can be readily removed from within the shell for serving.

The invention consists in the details of construction and the combination and arrangement of the several parts of my improved egg holder whereby certain important advantages are attained, as will be hereinafter more fully set forth.

In order that my invention may be the better understood, I will now proceed to describe the same with reference to the accompanying drawing, wherein:

Figure 1 is a view in elevation of an egg holder constructed in accordance with a preferred embodiment of my invention and in an open position;

Figure 2 is a view partly in elevation and partly in section of a holder with the parts in closed position; and Figure 3 is a sectional view taken substantially on the line 3—3 of Figure 1.

In an embodiment of the invention, as described in the accompanying drawings, my improved holder comprises two substantially double sections A, each of which comprises an elongated handle member 1 having its outer portion transversely enlarged and outwardly pressed to provide a convenient operating member or handle portion proper 2. A marginal portion of one of the operating members 2 is hingedly connected with an adjacent marginal portion of the second operating member through the medium of the circular links 4, each of which being freely disposed through properly positioned openings 5 provided in the marginal portions of the operating members 2.

The outer end of the handle member 1 is provided with an outwardly disposed and relatively short laterally disposed extension 6 which is welded or otherwise rigidly secured to a leaf 7 of an inwardly facing cup member C. The cup member C is of desired dimensions and depths and divided to provide therearound a plurality of spaced leaves 7 possessing a certain degree of inherent resiliency and which have inner extremities connected by a central bottom or head member 8. The leaves 7 of each of the cup members C are so formed as to approximate the curvature at an end portion of an egg so that when the cup members C are in closed position they may be readily engaged over the opposite end portions of an egg to facilitate the removal of the same from any kettle or other utensil. When the cups C are separated, as shown in Fig. 1, their central axes are substantially parallel. To remove an egg from a vessel and to serve the same the operator grasps the handle portions 2 in one hand and brings the device adjacent the egg in said vessel. By manipulation of handle portions 2 and said hand the operator swings the cups C about the axis of their connecting pins so that the cups move over the ends of the egg. The cups are moved together until the end portions of the egg are engaged, at which time the cups C are in substantially coaxial relation. The leaves 7 will diverge if necessary to grasp the egg. The egg can now be lifted from the vessel by the operator. The leaves 7 are also of such a length as to provide a space therebetween when engaged with an egg so that a knife or the like can be readily used for breaking through the central portion of the egg shell. After the egg has been severed the cups can be swung outwardly to open position with the egg sections therein and in a position to readily permit the removal of the egg from within the shell section through the medium of a spoon or the like.

Corresponding leaves 7 of the cup member C at their extremities are provided with laterally disposed knuckles which are pivotally connected one with the other whereby said cups C are maintained in desired spaced relation, yet capable of having desired swinging movement one toward the other in facing relation as illustrated in Figure 2.

I claim:

1. An egg server having in combination, a pair of elongated members having handle portions at one end adapted to be grasped together in one hand of the operator, a cup comprising circumferentially spaced diverging resilient leaves secured respectively to the other end of each of said members, said cups being hingedly connected and facing in the same direction when separated whereby said handle portions and cups may be swung to cause the open ends of said cups to approach each other to embrace the end portions of an egg and come into substantially coaxial relation, said egg being held by pressure on said handle portions.

2. An egg server having in combination, a pair of cups each comprising circumferentially spaced diverging resilient leaves, a pair of elongated members, each of said members being secured at one end to the outer end of one of said leaves of one of said cups, said cups being hingedly connected about an axis extending substantially parallel to said members, said members having handle portions adjacent their other ends whereby said handle portions can be grasped in one hand of the operator and manipulated to swing the open ends of said cups toward each other to cause said ends to move over the end portions of an egg so that the egg can be held by pressure on said handle portions.

3. An egg server having in combination, a pair of cups each comprising a central bottom portion and outwardly diverging circumferentially spaced leaves, a pair of elongated members, each of said members being secured at one of its ends to the end portion of one of said leaves of said cups respectively, said cups being hingedly connected by members secured adjacent the end portions of leaves disposed at substantially right angles to the leaves to which said members are connected, said members having handle portions at their other ends adapted to be grasped in one hand of the operator and manipulated to move the open ends of said cups toward each other to embrace the end portions of an egg whereby said egg can be held by pressure on said handle portions.

4. An egg server having in combination, a pair of cups each comprising a rigid bottom portion and a plurality of diverging circumferentially spaced resilient leaves, said leaves having concave inner sides and rounded edges, a hinge connecting the outer ends of adjacent leaves on said cups, a pair of elongated members respectively secured to other of said leaves and extending substantially parallel to the axis of said hinge, said elongated members having handle portions at their other ends whereby said handle portions can be grasped in one hand of the operator and manipulated to swing said cups from a position with their central axes parallel to a substantially coaxial position with said cups embracing the end portions of an egg.

5. The structure set forth in claim 4, said handle portions also being hingedly connected.

6. An egg server having in combination, a pair of cups each comprising a central rigid portion and a plurality of circumferentially spaced diverging leaves, means hingedly connecting adjacent leaves on said respective cups, elongated members secured to other leaves on said cups respectively, said members having handle portions at their other ends, and means hingedly connecting said handle portions about an axis substantially coincident with the axis of said first mentioned means.

JOHN J. DE LUCE.

REFERENCES CITED

The following references are of record in the file of this patent:

UNITED STATES PATENTS

| Number | Name | Date |
|---|---|---|
| 197,135 | Hunting | Nov. 13, 1877 |
| 738,154 | Brinkmann | Sept. 8, 1903 |
| 1,607,766 | McGarvey | Nov. 23, 1926 |